(No Model.) 5 Sheets—Sheet 1.
L. O. McPHERSON.
TELAUTOGRAPH.

No. 587,013. Patented July 27, 1897.

Attest:

Inventor:

(No Model.)

L. O. McPHERSON.
TELAUTOGRAPH.

No. 587,013.  Patented July 27, 1897.

(No Model.) 5 Sheets—Sheet 3.

L. O. McPHERSON.
TELAUTOGRAPH.

No. 587,013. Patented July 27, 1897.

(No Model.) 5 Sheets—Sheet 4.
L. O. McPHERSON.
TELAUTOGRAPH.

No. 587,013. Patented July 27, 1897.

(No Model.) 5 Sheets—Sheet 5.

L. O. McPHERSON.
TELAUTOGRAPH.

No. 587,013. Patented July 27, 1897.

Fig. 16.

Attest:
T. F. Kehoe
A. V. Bourke

Inventor:
L. O. McPherson
By Philipp Mauro & Phelps
Attys

UNITED STATES PATENT OFFICE.

LEON O. McPHERSON, OF HIGHLAND PARK, ILLINOIS, ASSIGNOR TO THE GRAY EUROPEAN TELAUTOGRAPH COMPANY, OF CHICAGO, ILLINOIS.

TELAUTOGRAPH.

SPECIFICATION forming part of Letters Patent No. 587,013, dated July 27, 1897.

Application filed October 9, 1895. Serial No. 565,129. (No model.)

*To all whom it may concern:*

Be it known that I, LEON O. MCPHERSON, a citizen of the United States, residing at Highland Park, county of Lake, and State of Illinois, have invented certain new and useful Improvements in Telautographs, fully described and represented in the following specification and the accompanying drawings, forming a part of the same.

My invention relates to telautographs of the general construction and organization shown in the patents to Elisha Gray, Nos. 461,470, 461,471, and 461,472.

My invention has for its object the improvement of various features of such telautographs with the view of obtaining greater certainty of action and simplicity of parts.

I will first point out in connection with the drawings the construction and operation of a preferred form of apparatus which I propose to employ and will then indicate the features thereof which I claim as new.

In the drawings annexed to this specification.

The transmitting portion of the instrument will first be described, then the receiving portion, and then the operation of the two together.

Figure 16:
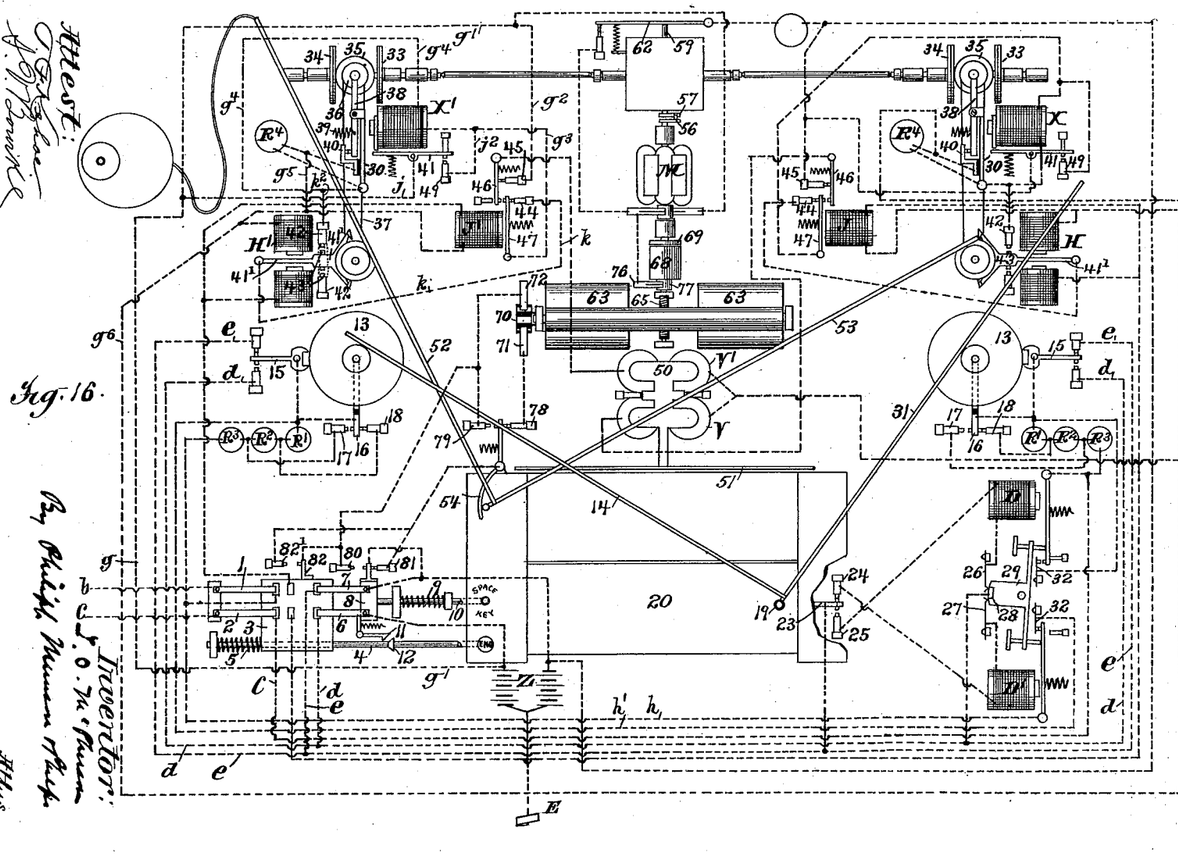
Fig. 16 is a diagrammatic sketch of the circuit connections of the combined receiving and transmitting instruments.

Referring to Fig. 16, the apparatus is shown in position for sending a message. As shown herein, my improvements are applied to a two-wire instrument, but many of them are equally applicable to a three or four wire instrument, and I do not limit myself in respect to them to two wires.

Line-wires $b$ $c$ connect with springs 1 and 2, which rest upon contacts carried by plate 3, which plate is connected to the rod 4, projecting vertically through the frame of the instrument and having on its top a button marked "End" in the drawing. This rod and plate are pressed by the spring 5 to the position shown, and, with the circuit connections, constitute the master-switch.

The transmitting-current passes from the split battery Z, connected on one side to earth, to springs 6 7, which also rest on contacts carried by the plate 3. These springs are attached to a movable block 8, held in the position shown by the spring 9, but capable of being depressed by the rod 10, the upper end of which is termed herein the "space-key," so that the springs 6 7 shall not rest upon their contact-plates. A pivoted lever-catch 11 is adapted to take over a collar 12 on the rod 4 and has a tail end which is in contact with the block 8, so that when the rod 4 is held down by the catch the depression of the block 8 will move the catch to release the rod and permit the master-switch to change its position.

The impulses are sent to line by the magnetic interrupting device patented by Elisha Gray in Patent No. 491,346, the magnet-wheel being revolved by connection with the pen-arm 14 and giving motion to the interrupter-lever 15. The Prony brake 16 is, as usual, frictionally attached to the shaft of the wheel 13 and rests against one or the other of the stops 17 18, according to the direction in which the pen-arm is moving. Resistances $R'$ $R^2$ $R^3$ are provided for sending currents of different strengths to line, as will be hereinafter explained.

The transmitting pen or pencil point 19 rests upon the paper, which in turn is supported by a platen 20, (see Fig. 2,) which is carried by pivoted arms 21. To the bottom of the platen is attached a pin 22, which bears upon the end of a pivoted lever 23, the other end of which is provided with contact-pins adapted to connect with fixed contact-points 24 25, according to the position of the platen. The construction of this mechanism is an improvement on that heretofore proposed, in that the contacts are not connected directly with the platen. Therefore when it is desired to remove the platen for any purpose it is not necessary to disturb the electrical connections of the instrument, and by this construction considerable inconvenience is avoided.

When the transmitting-pen is in operation, the current passes from the battery Z through the two springs 6 and 7 to wires $d$ $e$, which pass to both of the interrupters. Each interrupter will send to line, therefore, a current of positive or negative polarity according to the position of lever 15. The three resistances $R'$ $R^2$ $R^3$ are so arranged that the resistance $R^3$ is always in circuit, unless the pen-lifting mechanism is in operation. The additional resistance $R^2$ will be in circuit when the Prony brake 16 is resting against the stop 18, and resistance $R'$ will be in circuit only when the Prony brake 16 is at an intermediate position between the stops 17 and 18. It results from this that when the pen-arm 14 is moving in an upward direction the two resistances $R^2$ and $R^3$ will be in circuit, and when the movement of the arm is reversed and it takes a downward direction the single resistance $R^3$ will be in circuit. The strength of the current sent to line will therefore correspond to the direction of movement of the pen-arm. The same is true of the movements of the pen-arm 31, and similar resistances are provided on the other side of the instrument. While the Prony brake is in an intermediate position between the stops 17 and 18, the resistance $R'$ will be in circuit in addition to $R^2$ and $R^3$. This will have the effect, when the Prony brake is passing from stop 17 to 18, of causing a more prompt movement of the armature 47 than would otherwise occur.

For the purpose of controlling the raising and lowering of the receiving-pen in consonance with that of the transmitting-pen two relay-magnets D D' are provided and connected, as shown, with the stops 24 25, which are connected, respectively, with springs 26 27, which normally bear upon a contact-plate 28, carried by pivotal block 29, the position of which upon its pivot is determined by the pressure of the armatures, respectively, of the two magnets D D'. When the transmitting-pen is placed on the paper, the effect of the depression of the platen is to bring the end of the lever 23 into contact with stop 24 and send a current through magnet D', spring 27, plate 28, wires $e$ and $d$, and springs 6 and 7, whereby the magnet D' is energized and its armature attracted until it makes contact with spring 32, closing a circuit through the armature of the magnet D' and the wires $h$ $h'$, which cuts out all the resistances and sends a full-strength current to line-wire $b$. This current is, however, only momentary, since the attraction of the armature of magnet D' tilts the block 29 and breaks the contact between spring 27 and plate 28, whereupon the magnet D' releases its armature and breaks the short circuit around the resistances. The block 29 then remains in its tilted position, giving contact only to the spring 26 with the plate 28, until the transmitting-pen is lifted and lever 23 comes in contact with stop 25, when the magnet D is energized and a strong impulse in similar manner sent through line-wire $c$.

Referring now to the receiving side of the instrument, the escapement mechanism with its magnets H H' is substantially the same as that shown in the Gray patents. The escapement, actuated by the to-and-fro impulses received from the transmitter, governs the application of power to the receiving-pen by the motor M, acting through the springs and reversing mechanism, as in the Gray patent, No. 522,893.

Reversal in direction of motion of the receiving-pen is effected by means of the two disks 33 34, mounted upon the shaft driven from the motor, which disks communicate motion to the disk 35, carrying the drum 36, over which the belt 37 passes to a drum on the escapement-shaft. The engaging surfaces of the disks 33, 34, and 35 are of such material as to give suitable friction—for instance, soft rubber. The disk 35 is brought into contact with one or the other of the disks 33 34 by the vibration of the armature 30 of the magnet X'.

Figure 8:
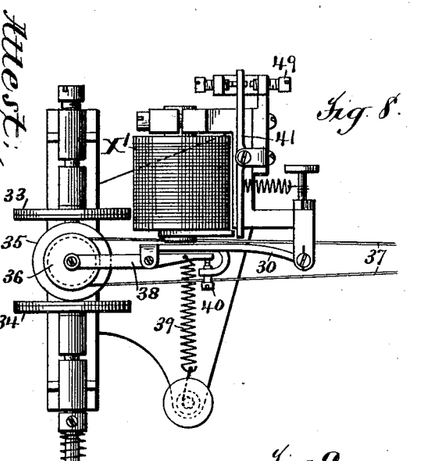
Fig. 8 is a top view, on an enlarged scale, of the reversing-magnet.
Figure 9:
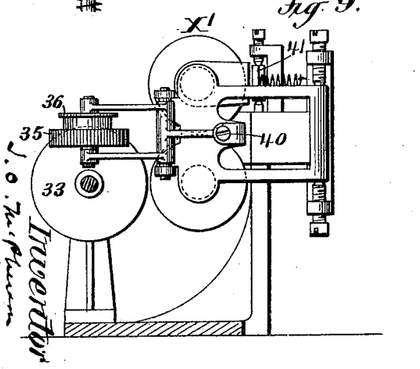
Fig. 9 is a side elevation of the same.

In instruments as heretofore constructed difficulty has been encountered in this respect, that when the frictional contact of this sort has been effected in one direction by a magnet and in the other direction by a spring it has not been practicable to exactly equalize the pulls in the two directions, the consequence of which has been an uneven strain and wear upon the apparatus according to the direction of movement of the receiving-pen, which has been found to be injurious. In order to overcome this difficulty, I mount the friction-disk upon a lever 38, independent of and pivoted to the end of the armature, and attach the retractile spring 39 to this lever. I also provide a stop 40, against which the rear end of the lever 38 abuts. When so mounted, the disk 35 is held against each of the disks 33 34 when in contact with it by the pull of the spring 39. The distance between the point of attachment of the spring and the pivotal point of the lever 38 is so proportioned to the other arm of the lever and to the distances between the point of attachment of the spring and the pivot of the lever 38 and the journal of the disk 35 that in each case the pull of the spring is exerted upon the disk at the same leverage, and consequently in each case the force at which the disk 35 is held against either the disk 33 or the disk 34 will be the same. The stop 40 is also utilized as an electrical contact for the purpose of cutting out a portion of the exciting-current of the magnet X′ immediately after the armature 30 is attracted, this being for the well-known reason that a less amount of current is required to hold an armature against a magnet than to draw it up to it. This resistance R⁴ is connected as shown, and will be hereinafter referred to in the description of the circuits.

The action of the reversing-magnet X′ is controlled by a reversing-relay J′, the armature of which is so adjusted as to be drawn forward by the normal current having in it only the resistance R³ and to be released and fall against its back-stop when the normal current has in it the two resistances R² and R³. This magnet J′ may be in series with the escapement-magnet, but I have found it preferable to place it in multiple arc, as shown.

In operating reversing-magnets by means of changes of strength in to-and-fro impulses this difficulty has been encountered and has been found very serious. While the reversing-relay will respond accurately and work as intended when the succession of the reversing-impulses is slow, if they become very rapid the proportion of time during which the core of the reversing-magnet is in a neutral condition between two successive impulses of reversed polarity becomes so considerable that the magnet is liable to lose its ability to retain its armature in its forward position, although the line-current is of the full normal strength. In such cases the armature is liable to be released, and thus to occasion a false reversal. In order to obviate this defect, I propose to make available another variation in the operation of the instrument due to the same cause—i. e., the increased frequency of the reversing-impulses. It is a fact that the range of movement of the lever 41′, carrying the escapement-pawls, becomes shorter as the impulses become more frequent. I propose, therefore, to introduce an arrangement of circuits whereby the magnet X′ shall be prevented from deënergization on the falling back of the armature of the magnet J′ if the latter occurs during a period of rapid succession of impulses in the main line. It will be seen that such an arrangement will effect the required object, because reversal is never required at a time when the succession of impulses is rapid for the reason that immediately before reversal the speed of the pen is necessarily diminished and reaches its minimum at reversal, it being, in fact, absolutely stationary at the precise moment of reversal. To this end I provide a second armature 41 for the magnet X′ with circuit connections, as shown, and I also provide contact-stops 42, contiguous to the lever carrying the escapement-pawls and placed where it will be touched by contacts 43 on the escapement-lever when the latter makes its extreme excursions, but so placed that when the reciprocations of the armature-lever are very rapid contact will not be made between the stops 42 and 43. To this stop 42 and the escapement-lever I make connections, as shown.

The operation of this part of the device will then be as follows: When the impulses sent from the transmitter are of the low strength—that is, reduced by both resistances R² R³—the armature of magnet J′ will lie upon its back-stop 44, and magnet X′ will be deënergized. When the line-current is increased in strength by the dropping out of the resistance R², the magnet J′ will attract its armature and the circuit will be completed from the battery Z through wires $g$ $g'$ $g^2$, stop 45, spring-lever 46, armature 47, wire $g^3$, magnet X′, wire $g^4$, armature 30, stop 40, wire $g^5$, and wire $g^6$ to the battery. The energization of magnet X′ under the influence of this current will cause it to draw up the secondary armature 41, thereby closing another or "locking" circuit from wire $g$, through wire $j$, lever 41, stop 49, wire $j^2$, magnet X′ to wire $g^4$. This circuit is independent of the position of the armature 47 on magnet J′, and even if the armature 47 falls on its back-stop, due to the rapid succession of reversing impulses in the line, the energization of magnet X′ will not be affected. When the armature 47 makes a true movement of reversal and falls upon its back-stop, owing to a reduction in the strength of the line-current, the circuit through the escapement-lever comes into play. At the moment of reversal the vibration of the escapement-lever is slow and its excursions long. Contact between the stops 42 and 43 is effected and a short circuit for the current is closed from wire $g$, through wire $j$, lever 41, stop 49, wire $j^2$, wire $g^3$, lever 47, stop 44, wire $k$, escapement-lever, stop 43, stop 42, wire $k^2$ to wire $g^4$, short-circuiting magnet X′, and causing it to release its armature.

The pen-raising mechanism at the receiving-station is actuated as follows: As has been before explained, when the transmitting-pen is placed upon the paper and the platen under it is depressed, all the resistances are cut out of the line-circuit $b$ and the full current set to line. As a result, the magnet J′ draws up its armature more strongly than usual, so that it presses against and moves the lever 46, thereby breaking the contact of lever 46 with the stop 45 and breaking the circuit of magnet V′, one of the two pen-lifting magnets. It results from this that the pivoted armature 50, which carries the pen-rest 51, tilts toward magnet V, raising the pen-rest 51 and the receiving-pen. When the transmitting-pen is raised from the paper, as before explained, a strong impulse is sent over the line-wire $c$, which results in breaking the circuit of the pen-lifting magnet V and reversing the position of the pen-rest.

The transmitting and the receiving instruments are brought into unison in this organization as follows: Having finished a line the transmitting operator places his pen upon a space-key and depresses it, the result of which is that the springs 6 and 7 are carried off their contacts and the currents on line are interrupted. In that condition of the circuits the organization is such that the pen-arm 52 of the receiving instrument is drawn back and the pen-arm 53 is moved forward, causing the receiving-pen to travel to the upper left-hand corner of its field, which corresponds to the position of the space-key in the transmitting-field. At this point the receiving-pen strikes and is arrested by a stop 54. The receiving-pen is thus mechanically stopped at a point in unison with the transmitting-pen upon the space-key.

I will now describe the manner in which the paper is shifted in my improved instrument.

Heretofore the paper in telautographs has been shifted by means of an independent magnet—viz., the motor for the receiving-pen has not been used for this purpose. It has not been considered practicable to use it for the reason that it is sometimes necessary to shift the paper when the receiving-pen is not in motion and the springs between the motor and the receiving-pen are fully wound up, and therefore the further rotation of the motor is prevented. To use a single motor for the moving of the receiving-pen and the shifting of the paper is an advantage in simplicity of construction, and I have found it possible to accomplish this by providing a detachable connection between the motor-shaft and the pen-driving mechanism, so that when the latter is fully wound up or stationary the motor can be, nevertheless, revolved to move the paper. This I accomplish in this way: The shaft of the motor (see Fig. 2) has on it an arm 55, provided with a pin 56, which engages with another pin 57 on arm 58, attached to shaft 59, carrying the worm-wheel 60, which engages with gear 61, through which the pen-driving springs are wound up, as in the Gray patent, No. 522,893. When the maximum tension of the pen-driving springs is attained, the shaft 59 moves outward, as explained in the Gray patent, and pushes back the arm 62, breaking the motor-circuit and preventing further winding of the pen-driving springs. The pins 56 57 in my apparatus will, however, be so adjusted to each other that at this point they will clear each other, and the motor may be revolved without further winding the pen-driving springs. I thus may use the motor at all times for feeding the paper, and in order that I may use it for this purpose I provide a second motor-circuit, which is only closed when the paper is to be fed.

The paper-feeding apparatus consists of a drum 63, mounted on a shaft 64, between which and the roller 65 the paper is gripped. The roller 63 is made in two pieces having a central opening between them, in which is mounted the worm-wheel 65', engaging with the worm 66 on the shaft 67. This shaft is connected to the shaft of the motor by means of a magnet-clutch, one member of which, 68, consisting of a magnet with a core and soft-iron shell, is fastened upon shaft 67, while the other member of the clutch consists of the disk-armature 69, fastened to the motor-shaft. On one end of the shaft 64 is a commutator 70, against which bear two springs 71 72, one resting upon an insulating-segment at the time when the other rests upon a metallic segment. The shaft 64 is insulated in its bearings. The springs 71 72 are insulated from their supports, and the bar 73, which carries the block 74, in which the shaft 67 is journaled, is insulated. To the bar 73 is also attached a block 74, which carries a spring 76, bearing upon a collar 77, mounted upon but insulated from the shaft 67. The inner end of the coil of the magnet 68 is connected to the shaft 67, and the outer end is connected to the collar 77. There is thus a circuit through the commutator-segments and worm-wheel 65 and worm-shaft 67, the coil of magnet 68, the collar 77, and the spring 76. Spring 76 is connected to one of the motor-brushes, as shown in Fig. 16. Spring 71 is connected to stop 78, against which plays one end of the pivoted stop 54. The stop 79 is placed on the opposite side of the end of pivoted stop 54 and is connected with brush 72. Connection is made between brush 72 and stop 79 with stop 80, as shown in Fig. 16. Stop 54 is also connected with stop 81, and stops 82 and 82' are provided with connections, as shown.

The shifting of the paper at the receiving-station is effected as follows: The receiving-pen strikes stop 54 and throws the end thereof in contact with stop 78. Connection is thus made from the battery through stop 81, block 8, and the connecting-wires to spring 71 and connected parts, as above indicated, through magnet 68 and the motor. This causes the magnet 68 to act as a friction-clutch and the motor to revolve, from which it results that the paper-feeding drum will be moved and feed the paper a certain distance—viz., until the spring 71 comes upon an insulating-segment. When the receiving-pen is withdrawn from the stop 54, the latter moves under the impulse of its retracting-spring until its end presses against stop 79, when a circuit is completed through spring 72, magnet 68, and the motor and the paper is fed a farther distance until the spring 72 falls upon an insulating-segment. The paper will now have been fed the ordinary distance between lines of writing. This manner of shifting the paper is of importance, since it permits a single condition of line-circuits to suffice for bringing the instruments to unison and effecting the movement of the paper. It has been usual to employ a special condition of circuits for the paper-shifting, which increases the number of necessary circuit conditions to an extent which has been found impracticable. At the same time the paper at the transmitter will have been fed a similar distance by reason of the contact made by the block 8 with stop 80, closing a circuit through brush 73, magnet 68, and the motor at the transmitting-station, and when the block 8 rises on the removal of the transmitting-pen from the space-key the circuit is again made by the contact of the block 8 with stop 81 and a second actuating-current sent through the magnet 68 and motor at the sending-station. Thus the feed of the paper at the sending-station will be completed, *pari passu*, with that at the receiving-station.

When the transmitting-operator has finished a message, it will be necessary to run off an amount of paper equivalent to that occupied by the message in order to leave a clear field for the receiving-pen, and provision for accomplishing this is made by the stops 82 82', which come in contact with each other when the master-switch is pressed down to its lowest position. The circuit will then be closed from the battery to both springs 71 72 and the paper at the sending-station will therefore be fed until the plate 3 is released and the stops 82 82' allowed to separate. When the master-switch is released, it rises very slightly until the collar 12 is engaged by the catch 11 and the switch thereby held in receiving position.

It will be understood that the circuit connections are the same on the two sides of the receiving instrument and the explanation above given will apply to both.

Figure 10:
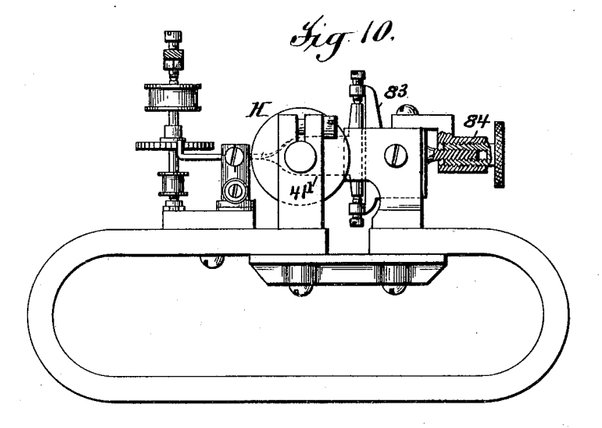
Fig. 10 is a side elevation, and Fig. 11 a top view, of the escapement-magnet.
Figure 11:
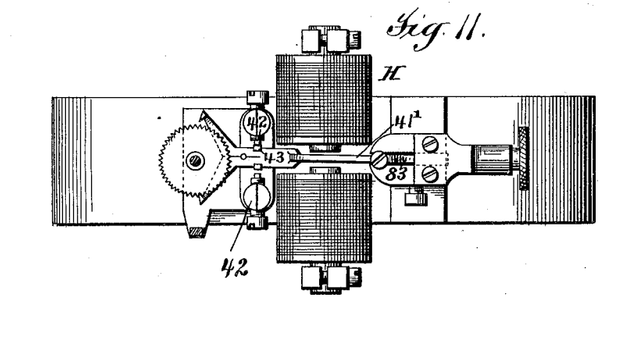

The construction of the escapement-magnet, its pallets, and the connecting parts probably do not require any special explanation. They are shown on an enlarged scale in Figs. 10 and 11. The pivoted armature 41', carrying the pawls and escapement-pallets, is mounted in the block 83, provided with a differential adjusting-screw 84 to permit exact adjustment of the pallets to the escapement-wheel.

Figure 4:
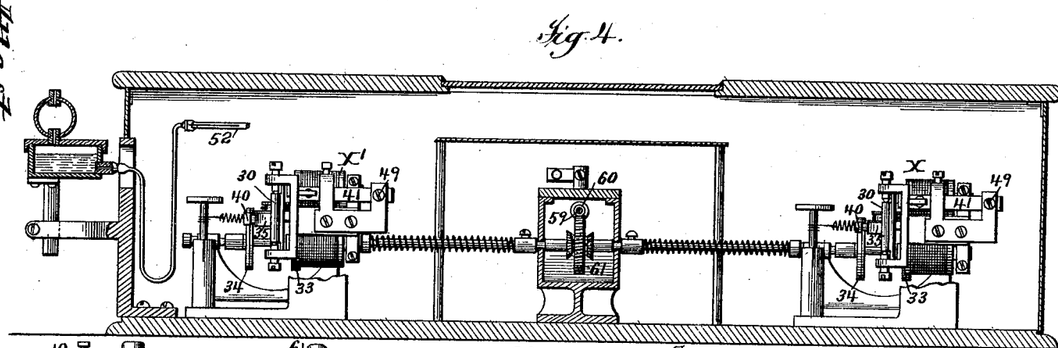
Fig. 4 is a like elevation on the line 4 4 of Fig. 1.
Figure 5:
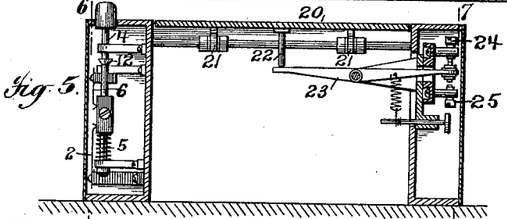
Fig. 5 is a like elevation on the line 5 5 of Fig. 1.
Figure 6:
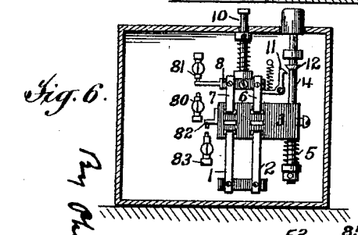
Fig. 6 is a like elevation on the line 6 6 of Fig. 5.
Figure 7:
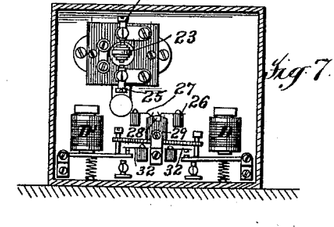
Fig. 7 is a like elevation on the line 7 7 of Fig. 5.

Considerable difficulty has been encountered in the use of telautographic pens from their liability to become clogged. To overcome this difficulty, I propose to apply a force-pump to the ink-well. A convenient form of this pump is shown in Fig. 4 and consists of a flexible bulb attached to the ink-well having an air-passage between it and the ink-well and between it and the exterior air. When it is desired to use it to clear out the pen, the finger or thumb is placed upon the air-opening of the bulb and the bulb is compressed, forcing ink through the tube and pen.

Figure 1:
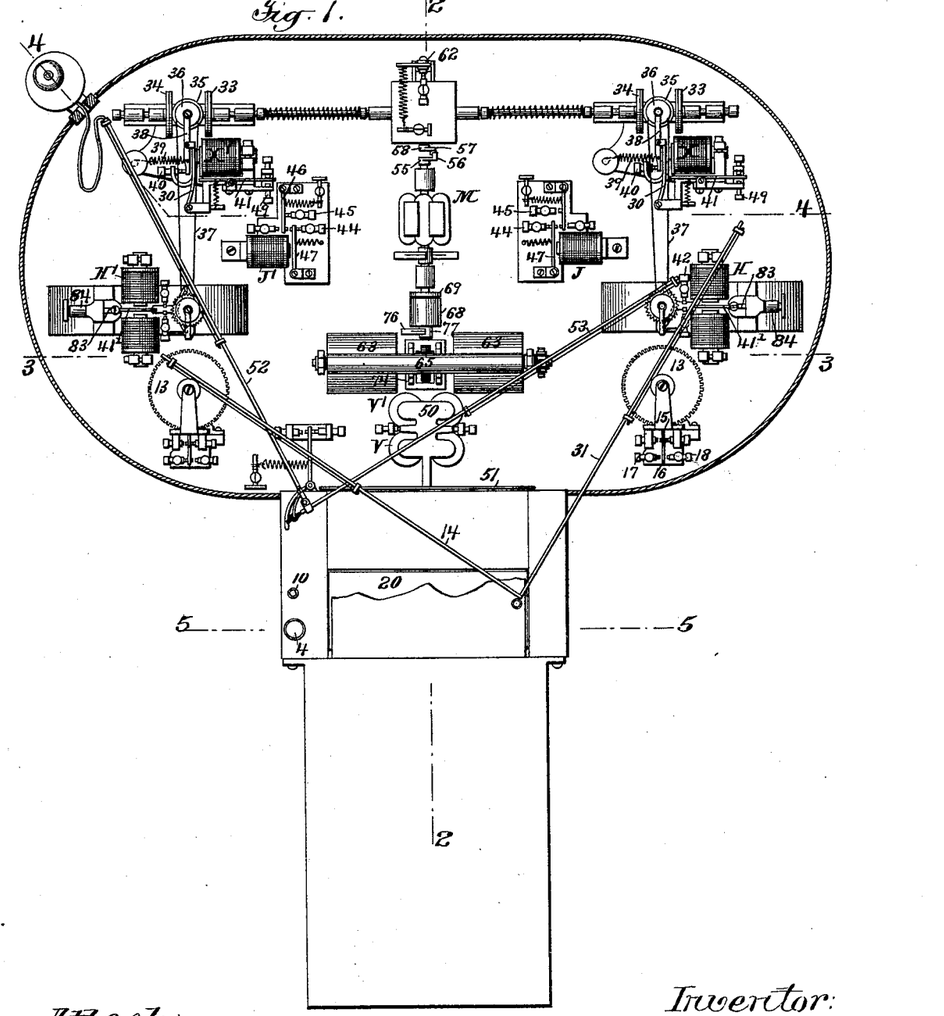
Figure 1 is a plan view of a telautographic instrument embodying my invention.
Figure 2:
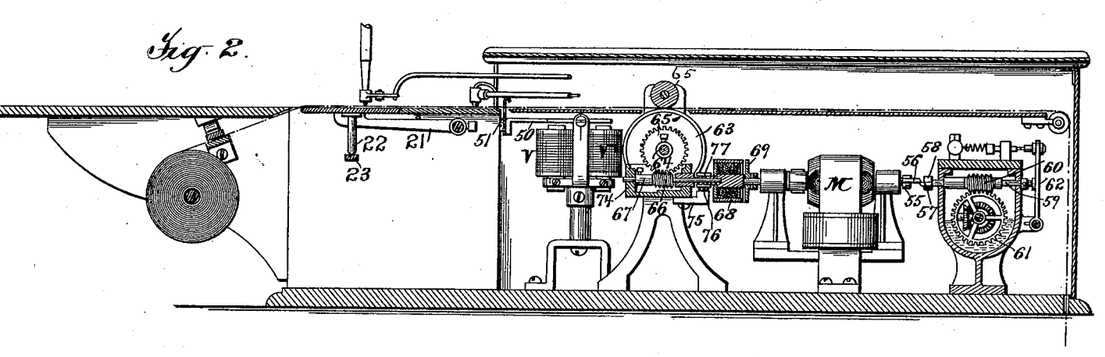
Fig. 2 is a sectional elevation of the same on the line 2 2 of Fig. 1.
Figure 3:
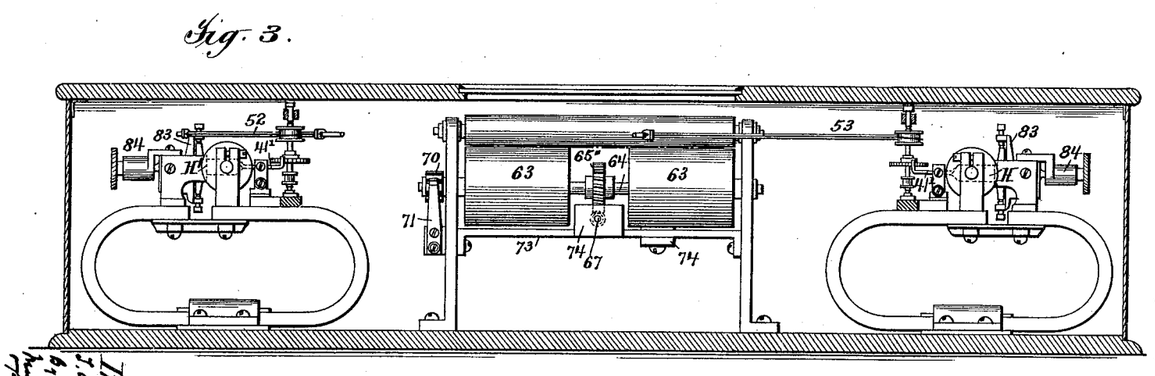
Fig. 3 is a like elevation on the line 3 3 of Fig. 1.
Figure 14:
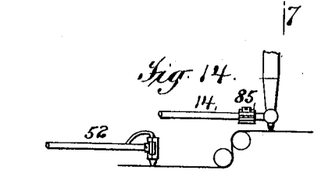
Fig. 14 is a view of the receiving and transmitting pen-points resting upon the paper in proximity to each other, showing a modified construction.
Figure 15:
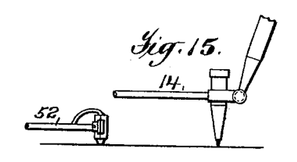
Fig. 15 shows another modified construction, whereby the receiving and transmitting pen-points may be brought into proximity without interference.

It is of importance in telautographic instruments that a single strip of paper should be used for the transmitting and receiving pens and that the writing-fields of the two pens should be contiguous to each other in order to secure compactness in the instrument. Such an arrangement is impossible, however, unless provision is made for preventing the pen-arms from interfering with each other. The arrangement has been attempted by providing means for causing the receiving-pen to move away at the completion of its work to a position outside of its writing-field. This, however, introduces a complication into the connections of the system which it is desirable to avoid. In my present invention I have made this arrangement practicable by placing the pen-arms of one of the pens at a higher level than the pen-arms of the other. This is accomplished by making the pen or pencil point of the upper pair of arms longer than the point of the lower pair of arms and mounting the other ends of the arms correspondingly higher, as shown in Fig. 15, or the same effect may be secured by curving downward the ends of the upper pair of arms near the pen or pencil, as shown in Fig. 2. An equivalent construction for lengthening the pen-point attached to the upper pair of arms or curving these arms is to place the paper on two different levels under the two pens, respectively, as shown in Fig. 14.

The transmitting and receiving instruments are placed on the same base, and the two pairs of arms project from their swinging points outward in the same direction, that pair which moves in the higher plane projecting farther than the other pair, so that its pencil-point is free to move on the paper without interfering with the lower arms. The transmitter pair of arms are so that interference may be avoided, and for them the uppermost cords may be used instead of the stiff arms and are to be regarded as the equivalents thereof.

Figures 12, 13:
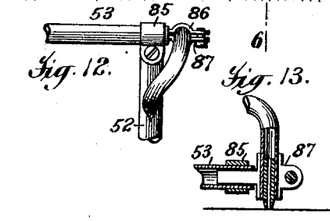
Figs. 12 and 13 are detail views of the ends of the pen-arms and pens.

A convenient method of attaching the pen-points to the pen-arms is shown in Figs. 12 and 13. One arm is united to the other by a clip 85, and the other arm is embraced by two clips 86 87, inserted in the hollow end of one of the arms and united outside the pen-point by a screw.

It will be noticed that I have shown the casing for the telautograph with an extension for the writing-fields, having on each side a compartment, for the master-switch on one side and the platen-contacts and the pen-lifting circuit connections on the other. This is a desirable arrangement in that it permits ready access to these parts of the apparatus without disturbing the main case.

It is obvious that many modifications may be made in the various parts of the apparatus without departing from my invention. I will name several modifications which now occur to me.

In place of the auxiliary armature for the magnets X X' the same result can be secured by the addition of another magnet with the proper circuit connections, the armature of this second magnet operating in the same way as the armature 41.

The effect secured by means of the circuit made and broken by the contacts on the escapement-lever will be secured by the use of an additional magnet with proper circuit connections. It is well known that the excursions of the armature of a magnet when the impulses rapidly succeed each other are smaller than when the impulses are less frequent. Consequently a magnet additional to those shown, with a contact provided on its armature playing against a stop when the impulses energizing the magnet were slow and not touching the stop when the impulses were rapid, would perform the same function as that performed by the escapement-lever and stops 42 and the circuit connections.

What is claimed is—

1. In a telautographic system, the combination of mechanism for sending pulsations of successively-alternate polarity for controlling the operation of a receiving-pen, a reversing mechanism, a reversing-relay in the circuit of said pulsations for controlling the operation of the reversing mechanism, the same being controlled by changes in the strength of said pulsations, and means whereby the action of the reversing-relay is effected by changes in the rapidity of the succession of said pulsations, substantially as set forth.

2. In a telautographic system, the combination of mechanism for sending pulsations of successively-alternate polarity for controlling the operation of a receiving-pen, a reversing mechanism, a reversing-relay in the circuit of said pulsations for controlling the operation of the reversing mechanism, the same being controlled by changes in the strength of said pulsations, a circuit maker and breaker controlled by variation in the speed of the pulsations, and means whereby the operation of the last-named circuit maker and breaker is caused to prevent false movement of the reversing-relay, substantially as set forth.

3. In a telautographic system, the combination of mechanism for sending pulsations of successively-alternate polarity for controlling the operation of a receiving-pen, a reversing mechanism, a reversing-relay in the circuit of said pulsations for controlling the operation of the reversing mechanism, the same being controlled by changes in the strength of said pulsations, a magnet governing the reversing mechanism, a locking-circuit operated by the reversing-relay in one of its positions and a circuit and connections operated by changes in the rapidity of succession of said pulsations which controls the magnetic condition of the reversing-magnet, substantially as set forth.

4. In the sending of telautographic messages, the method of preventing false action of the reversing mechanism due to increased frequency of to-and-fro pulsations which consists in causing variations in the rapidity of the succession of said pulsations to control a circuit which offsets the tendency of the reversing mechanism to make false movements under the influence of said variations in rapidity, substantially as set forth.

5. The combination in a telautographic system of means for transmitting pulsations of successively-alternate polarity to drive a receiving-pen, a reversing-relay operated by changes in the strength of said pulsations and a circuit controlled by the rapidity of the succession of said pulsations for preventing false operation of the reversing-relay, substantially as set forth.

6. In a telautographic system, the combination of means for sending pulsations of successively-reverse polarity, means for changing the strength of said pulsations, a circuit-controller operated by said changes of strength, and a circuit-controller operated by changes in the rapidity of the succession of said reverse pulsations for correcting the effects of rapidity in the succession of said pulsations upon the first-mentioned circuit-controller, substantially as set forth.

7. In a telautographic system, the combination of a circuit, means for sending pulsations therein of successively-reverse polarity, a magnet in said circuit, a lever caused to vibrate thereby, and a second circuit for performing a function in the transmission of messages, said lever being a part of said second circuit and operating to close said circuit under one condition of frequency and to leave said circuit open under another condition of frequency, substantially as set forth.

8. In a telautographic system, the combination of means for sending pulsations of successively-reversed polarity to drive a receiving-pen, a reversing-magnet, a reversing-relay operated by changes in strength of said pulsations, a locking-circuit for preventing false movements of the reversing-relay affecting the reversing mechanism, and means for releasing said locking-circuit when the direction of motion of the transmitting-pen is reversed, substantially as set forth.

9. In a telautographic instrument, the combination of means for shifting the paper at the receiving-station, means for causing the receiving-pen to move in accordance with the movements of the transmitting-pen means for stopping the receiving instrument at a given position of the receiving-pen, a circuit-controller operated by the force of the instrument tending to advance at the point when so stopped, and a circuit controlled by said circuit-controller for controlling the paper-shifting mechanism, substantially as set forth.

10. In a telautographic instrument, as a means for shifting the paper at the receiving-station, the combination of a spring-stop for arresting the movement of the instrument at a given position of the receiving-pen, a circuit-controller operated by the movement of said spring-stop under the pressure of the instrument when arrested, and a circuit controlled by said circuit-controller and in turn controlling the paper-shifting mechanism, substantially as set forth.

11. In a telautographic system, the combination of means for effecting a given condition of the circuit when the transmitting-pen is placed at a given point in its field, connections whereby upon the bringing of said transmitting-pen to said point the receiving-pen is caused to travel to a corresponding point in the receiving-field, a stop for arresting the receiving mechanism when the receiving-pen has reached said point, a circuit-controller operated by the pressure of the receiving instrument due to its tendency to advance at said point, and a circuit controlled by said circuit-controller for operating the paper-shifting mechanism whereby unison is effected and the paper shifted by one operation, substantially as set forth.

12. In a telautographic instrument, the combination of a motor, a mechanism for storing power to drive the receiving-pen operated by the motor, means for disconnecting the motor from the said mechanism when the normal amount of power is stored therein, and a paper-shifting mechanism also operated by the motor, substantially as set forth.

13. In a telautographic instrument, the combination of a motor, a pen-driving mechanism connected therewith and operated thereby, a motor-circuit for causing the motor to operate upon the pen-driving mechanism, a paper-shifting mechanism also operated by the motor, and an independent motor-circuit for causing the motor to operate the paper-shifting mechanism when the other motor-circuit is open, substantially as set forth.

14. As a means for operating a frictional clutch, the combination of a magnet, a pivoted armature therefor, a bar pivoted to the armature and carrying the movable member of the clutch, a stop for said bar and a spring, substantially as set forth.

15. As a means for operating a frictional clutch, the combination of a magnet for moving the movable member of the clutch in one direction, a spring for moving it in the other direction, a pivoted armature for the magnet, and a bar pivoted to the armature and carrying the movable member of the clutch, whereby the tension upon the clutch member is in both positions equal to the tension of the spring, substantially as set forth.

16. The combination of magnet X', armature 30, bar 38 pivoted thereto, spring 39, stop 40, and a clutch member mounted upon bar 38, substantially as set forth.

17. In a telautographic instrument, the combination of a transmitting and receiving pen and mechanism for operating the same mounted upon the same base, two pairs of arms one for each pen projecting from the operating mechanism in the same direction and overlapping each other and being mounted to move in different horizontal planes; the upper pair of said pairs of arms carrying the transmitting-pen and projecting beyond the lower pair, so that the pens may operate upon writing-fields contiguous to each other without interference, substantially as described.

18. In a telautographic instrument, the combination of a transmitting and receiving pen and mechanism for operating the same mounted upon the same base, two pairs of arms one for each pen projecting from the operating mechanism in the same direction and overlapping each other and being mounted to move in different horizontal planes; the upper pair of said pairs of arms carrying the transmitting-pen and projecting beyond the lower pair, and being curved downward near the point where they are attached to the pen so that the pens may operate upon writing-fields contiguous to each other without interference, substantially as described.

19. In a telautographic instrument, the combination of a motor, a circuit therefor, a pen-driving mechanism connected therewith and operated upon thereby when said circuit is closed, a paper-shifting mechanism also operated by the motor, an independent circuit for the motor, and means for controlling said independent circuit when it is desired to shift the paper at times when the first-named circuit is broken, substantially as set forth.

20. In a telautographic instrument, the combination of the space-key by operating which the unison and shifting of the paper is effected, a master-switch, by means of which the instrument is thrown from the transmitting to the receiving position, and vice versa, and interlocking mechanism between the space-key and the master-switch such that when the space-key is operated, the master-switch is released and caused to move to transmitting position, substantially as set forth.

21. In a telautographic instrument, the combination of a master-switch for changing the instrument from transmitting to receiving position, a spring for holding the switch normally in transmitting position, a catch for holding the switch in receiving position, and a paper-shifting and unison switch controlling said catch and releasing the master-switch when operated, substantially as set forth.

22. The combination of a transmitting-pen, the Prony brake 16, the three resistances R', R², R³, and circuit connections whereby the pulsations sent to line are reduced by the resistance R³ for moving the pen in one direction and by the resistances R² plus R³ for moving the pen in the other direction, and by the resistances R', R² and R³ when the Prony brake is in an intermediate position, substantially as set forth.

23. As a means for sending pulsations of increased strength to line upon the lowering or the raising of the transmitting-pen, the combination of magnets D, D' and armatures therefor, pivoted block 29 having a contact-plate 28, springs 26, 27, and circuit connections, substantially as set forth.

24. The combination with a telautographic pen, of an ink-reservoir, a tube of small diameter connecting the pen with the ink-reservoir, and a force-pump for operating upon the ink in the reservoir to clear out the tube and pen, substantially as set forth.

25. The combination with a telautographic pen, of an ink-reservoir, a tube of small diameter connecting the pen with the reservoir, and a compressible bulb with an aperture therethrough for applying pressure to the ink in the reservoir, substantially as set forth.

In testimony whereof I have hereunto set my hand in the presence of two subscribing witnesses.

LEON O. McPHERSON.

Witnesses:
HARRY S. GUILFORD,
W. M. GOODRIDGE.